(12) United States Patent
Goto (10) Patent No.: US 11,745,339 B2
(45) Date of Patent: Sep. 5, 2023

(54) HORIZONTAL ARTICULATED ROBOT

(71) Applicant: Seiko Epson Corporation, Tokyo (JP)

(72) Inventor: Yoshinobu Goto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 264 days.

(21) Appl. No.: 16/774,183

(22) Filed: Jan. 28, 2020

(65) Prior Publication Data
US 2020/0238515 A1     Jul. 30, 2020

(30) Foreign Application Priority Data

Jan. 29, 2019   (JP) ................................ 2019-012828

(51) Int. Cl.
    *B25J 9/16*        (2006.01)
    *B25J 17/02*      (2006.01)

(52) U.S. Cl.
    CPC ........... *B25J 9/1633* (2013.01); *B25J 17/025* (2013.01)

(58) Field of Classification Search
    CPC ........ B25J 9/1633; B25J 17/025; B25J 9/044; B25J 13/085; B25J 9/0081; B25J 17/00
    See application file for complete search history.

(56) References Cited

U.S. PATENT DOCUMENTS

| | | | | |
|---|---|---|---|---|
| 4,882,527 | A * | 11/1989 | Yakuyama | ........... G05B 19/425 318/568.2 |
| 6,477,448 | B1 | 11/2002 | Maruyama | |
| 2005/0027398 | A1 * | 2/2005 | Tokutake | ............. G05B 19/427 318/568.12 |
| 2005/0087034 | A1 * | 4/2005 | Friedrich | ................. B25J 9/044 74/490.03 |
| 2015/0290809 | A1 * | 10/2015 | Nakagawa | ............. B25J 9/1676 700/258 |
| 2017/0095932 | A1 | 4/2017 | Murakami | |
| 2017/0343998 | A1 * | 11/2017 | Takayama | ............ G05B 19/423 |

(Continued)

FOREIGN PATENT DOCUMENTS

| | | |
|---|---|---|
| CN | 107457777 A | 12/2017 |
| JP | S6016387 A | 1/1985 |

(Continued)

OTHER PUBLICATIONS

Search Report of the First Office Action CN Application No. 202010071927X dated Sep. 23, 2022.

*Primary Examiner* — Abby Y Lin
*Assistant Examiner* — Danielle Marie Jackson
(74) *Attorney, Agent, or Firm* — Gang Yu (57) ABSTRACT

A horizontal articulated robot includes a base, a force detection unit provided in the base, a first arm coupled to the base and pivoting about a first pivot axis, a second arm coupled to the first arm and pivoting about a second pivot axis, a third arm coupled to the second arm, pivoting about a third pivot axis, and moving in an axial direction of the third pivot axis, a control unit that controls an action of the first arm, the second arm, or the third arm based on a detection value of the force detection unit, and an operation unit having a third arm operation part for operation of the third arm and a teaching point registration operation part for operation of registration of a position of a control point as a teaching point using the control unit, and provided in the second arm.

10 Claims, 5 Drawing Sheets

(56) References Cited

U.S. PATENT DOCUMENTS

2018/0029221 A1    2/2018   Tanaka et al.
2018/0200881 A1    7/2018   Ishii
2020/0121403 A1*   4/2020   Awano ................... B25J 9/1664

FOREIGN PATENT DOCUMENTS

| JP | H03-055195 A  | 3/1991 |
| JP | 2000246674 A  | 9/2000 |
| JP | 2017-064878 A | 4/2017 |
| JP | 2018-015853 A | 2/2018 |
| JP | 2018-111174 A | 7/2018 |

* cited by examiner

HORIZONTAL ARTICULATED ROBOT

The present application is based on, and claims priority from JP Application Serial Number 2019-012828, filed Jan. 29, 2019, the disclosure of which is hereby incorporated by reference herein in its entirety.

BACKGROUND

1. Technical Field

The present disclosure relates to a horizontal articulated robot.

2. Related Art

In related art, industrial robots that perform various kinds of work on work objects in place of humans are used. As an example of the industrial robots, e.g. a robot having a base, a robot arm pivotably provided relative to the base, and a motor provided within the robot arm and driving the robot arm is known.

Recently, in the industrial robots, robots acting in the same work areas as those of humans have been known. In the robot, for example, as disclosed in JP-A-2018-111174, a technique of sensing contact of a teacher based on a detection value of a first force sensor provided in the base of the robot and a technique of teaching to a desired taught position by detecting an operation force generated when the teacher manually operates the arm of the robot using a second force sensor provided in a hand of the robot and moving the arm based on a detection value of the second force sensor, the so-called direct teaching is used.

However, it is impossible for the force sensor to detect the operation force of the teacher unless the teacher holds and operates a part at the distal end of the force sensor provided in the hand of the arm. Thus, for example, when direct teaching is performed for a horizontal articulated robot, the part to be held by the teacher may hide in the arm cover depending on the position and posture of the distal end arm and a teaching apparatus such as a teaching pendant coupled to the robot should be used, and it may be hard for the teacher to intuitively teach.

SUMMARY

A horizontal articulated robot according to an aspect of this application includes a base, a force detection unit provided in the base, a first arm coupled to the base and pivoting about a first pivot axis, a second arm coupled to the first arm and pivoting about a second pivot axis, a third arm coupled to the second arm, pivoting about a third pivot axis, and moving in an axial direction of the third pivot axis, a control unit that controls an action of the first arm, the second arm, or the third arm based on a detection value of the force detection unit, and an operation unit having a third arm operation part for operation of the third arm and a teaching point registration operation part for operation of registration of a position of a control point as a teaching point using the control unit, and provided in the second arm.

In the above described horizontal articulated robot, in a plan view from the axial direction of the third pivot axis, a distance from the operation unit to the third pivot axis may be shorter than a distance from the second pivot axis to the third pivot axis.

In the above described horizontal articulated robot, in a plan view from the axial direction of the third pivot axis, the operation unit may overlap with the third arm.

In the above described horizontal articulated robot, a plurality of the operation units may be provided in the second arm.

In the above described horizontal articulated robot, the operation unit may have an end effector operation part for operation of an end effector attached to the third arm.

DESCRIPTION OF EXEMPLARY EMBODIMENTS

As below, a robot according to the present disclosure will be explained in detail based on embodiments shown in the accompanying drawings.

First Embodiment

Basic Configuration of Robot

Figure 1:
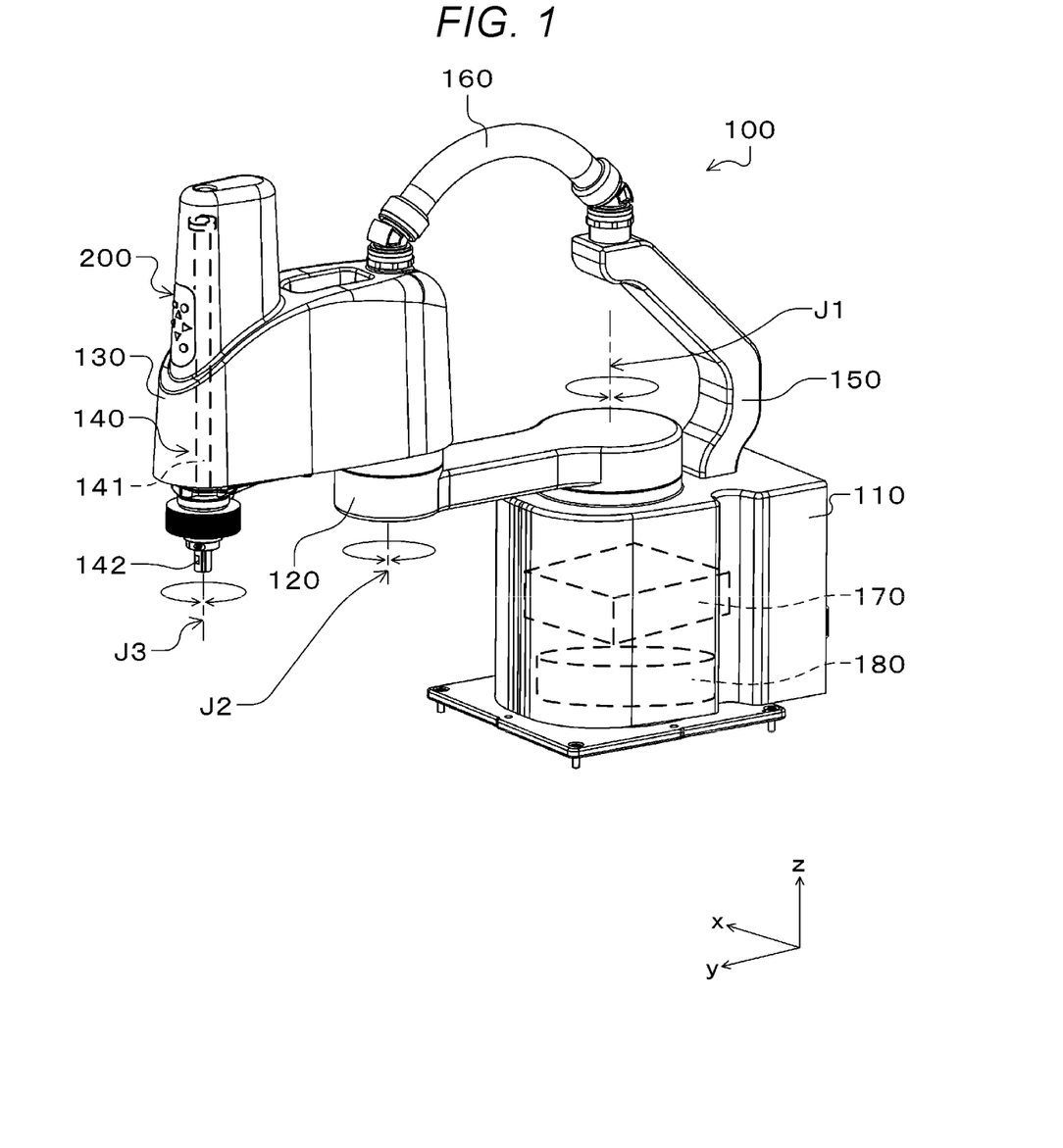
FIG. 1 is a perspective view showing a robot according to a first embodiment.
Figure 2:
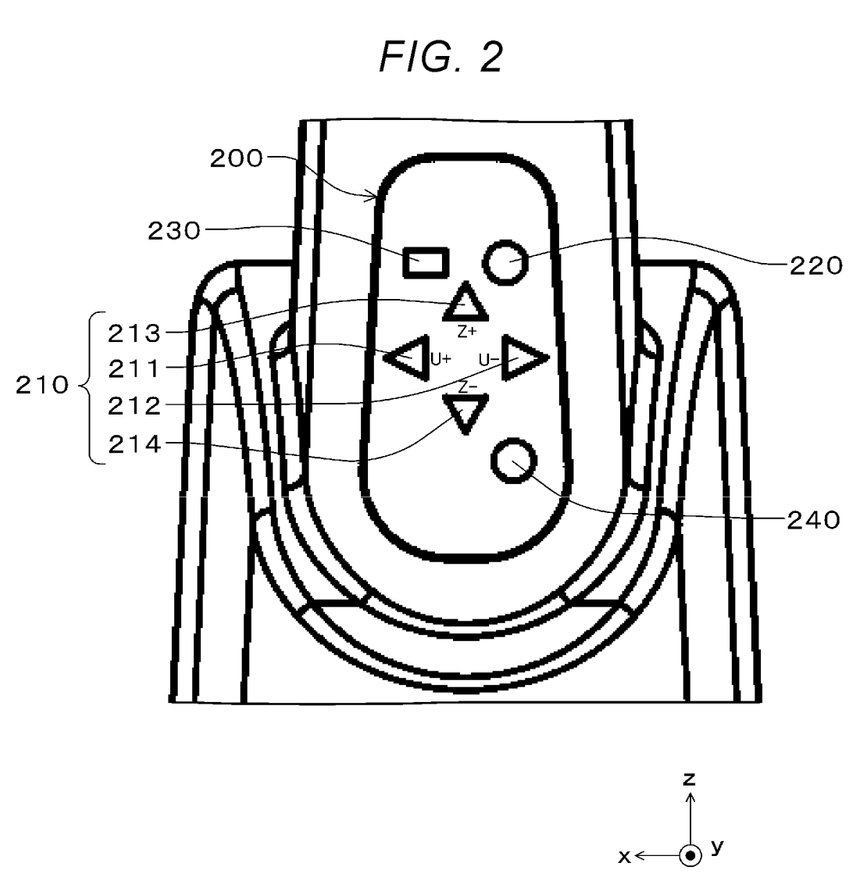
FIG. 2 is a plan view of an operation unit provided in a second arm as seen from a +y-axis side.
Figure 3:
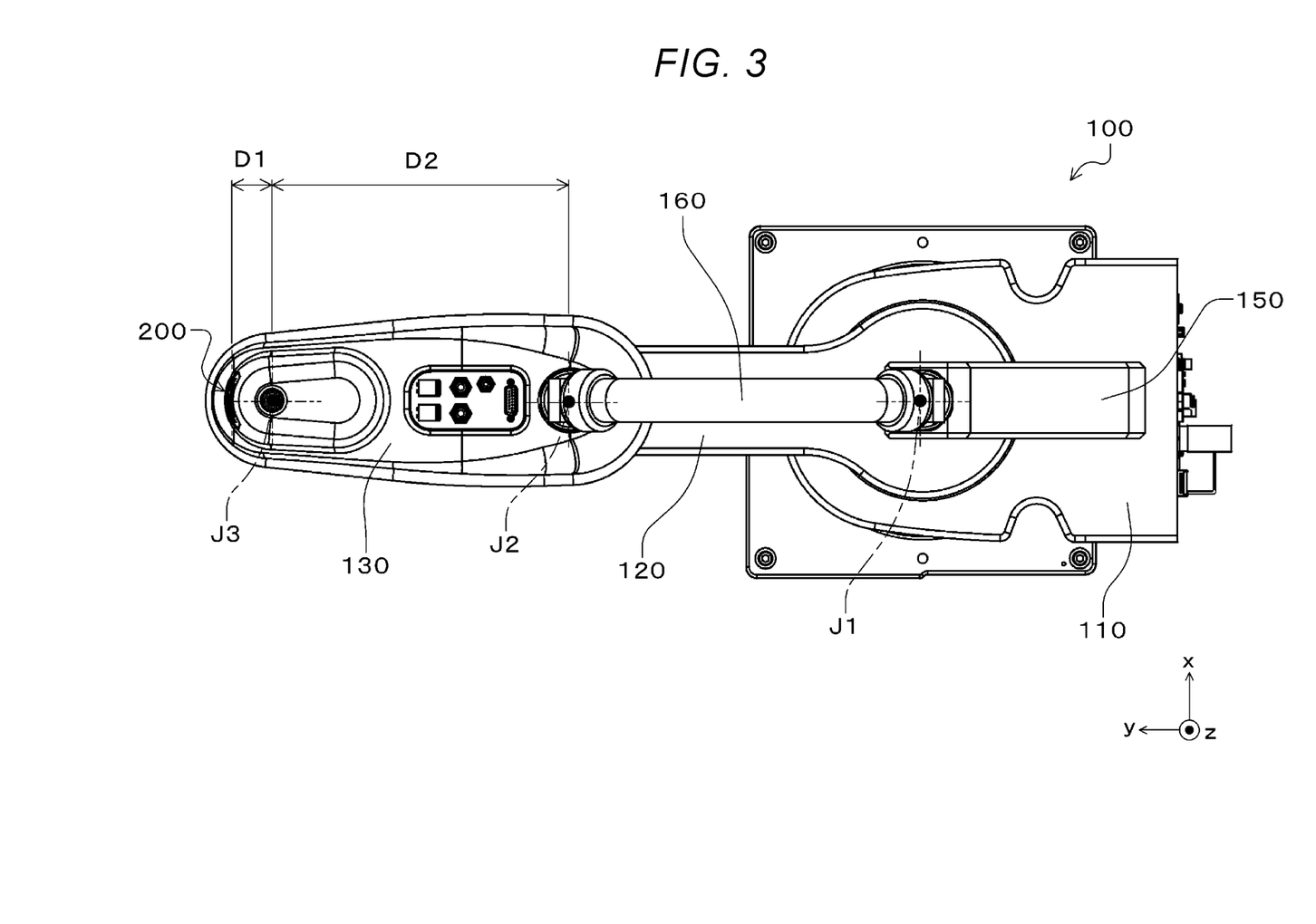
FIG. 3 is a plan view of the robot shown in FIG. 1 as seen from a +z-axis side.

FIG. 1 is the perspective view showing the robot according to the first embodiment. A base 110 side of a robot 100 shown in FIG. 1 is referred to as "proximal end" and an end effector 142 side as an opposite side thereto is referred to as "distal end". FIG. 2 is the plan view of a second arm 130 of the robot 100 as seen from the +y-axis side. Note that, hereinafter, for convenience of explanation, the upsides in FIGS. 1 and 2 are referred to as "upper" and the downsides are referred to as "lower". FIG. 3 is the plan view of the robot 100 shown in FIG. 1 as seen from the +z-axis side. In FIGS. 1 to 3, for convenience of explanation, an x-axis, a y-axis, and a z-axis are respectively shown as three axes orthogonal to one another, and the head sides of the arrows indicating the respective axes are referred to as "+" and the tail sides are referred to as "−". Further, the directions parallel to the x-axis are referred to as "x-axis directions", the directions parallel to the y-axis are referred to as "y-axis directions", and the directions parallel to the z-axis are referred to as "z-axis directions".

The robot 100 shown in FIG. 1 is a horizontal articulated robot. In the embodiment, "horizontal articulated robot" refers to the so-called scalar robot having a plurality of arms that pivot about pivot axes along directions parallel to one another, but not having an arm that pivots about a pivot axis along a direction perpendicular to the pivot axes of those plurality of arms.

As below, first, a basic configuration of the robot 100 will be explained.

As shown in FIG. 1, the robot 100 has the base 110, a first arm 120, the second arm 130, a third arm 140, a supporting part 150, and a duct 160. As below, the respective parts of the robot 100 will be sequentially and briefly explained.

Base

The base 110 has an rectangular parallelepiped outer shape and fixed to e.g. a floor surface (not shown) with bolts or the like. The placement position of the base 110 is not particularly limited, but may be a floor, wall, ceiling, workbench, movable platform, or the like.

Within the base 110, a control unit 170 that controls actions of the robot 100, a force detection unit 180 that detects a force applied to the robot 100, a first motor (not shown) that generates drive power for pivoting the first arm 120, and a first reducer (not shown) that increases the drive power of the first motor are provided.

First Arm

The first arm 120 is coupled to an upper end portion of the base 110. Further, the first arm 120 is pivotable about a first pivot axis J1 parallel to the z-axis relative to the base 110.

An input shaft of the first reducer is coupled to the first motor and an output shaft of the first reducer is coupled to the first arm 120. Accordingly, when the first motor is driven and the drive power is transmitted to the first arm 120 via the first reducer, the first arm 120 pivots about the first pivot axis J1 relative to the base 110. Further, a first encoder (not shown) that detects the pivot state of the first arm 120 relative to the base 110 is provided in the first motor.

Second Arm

The second arm 130 is coupled to the distal end portion of the first arm 120. The second arm 130 is pivotable about a second pivot axis J2 parallel to the z-axis relative to the first arm 120. That is, the first pivot axis J1 and the second pivot axis J2 are parallel.

Further, in the second arm 130, a second motor (not shown) that generates drive power for pivoting the second arm 130, and a second reducer (not shown) that increases the drive power of the second motor are provided. The drive power of the second motor is transmitted to the second arm 130 via the second reducer, and thereby, the second arm 130 pivots about the second pivot axis J2 relative to the first arm 120. Further, a second encoder (not shown) that detects the pivot state of the second arm 130 relative to the first arm 120 is provided in the second motor. Furthermore, an operation unit 200 is provided in the second arm 130 and will be described later in detail.

Third Arm

The third arm 140 is coupled to the distal end portion of the second arm 130. The third arm 140 is pivotable about a third pivot axis J3 and movable in an axial direction of the third pivot axis J3 relative to the second arm 130.

The third arm 140 has a spline shaft 141 inserted through a spline nut (not shown) and a ball screw nut (not shown) coaxially placed in the distal end portion of the second arm 130. The spline shaft 141 is pivotable about the third pivot axis J3 parallel to the z-axis and movable (upward and downward) in parallel to the z-axis relative to the second arm 130. That is, the third pivot axis J3 is parallel to the first pivot axis J1 and parallel to the second pivot axis J2.

Further, a third motor (not shown) and a fourth motor (not shown) are provided in the second arm 130. The drive power of the third motor is transmitted to the spline nut by a drive power transmission mechanism (not shown) and, when the spline nut rotates forward and backward, the spline shaft 141 rotates forward and backward about the third pivot axis J3. Furthermore, a third encoder (not shown) that detects the pivot state of the spline shaft 141 relative to the second arm 130 is provided in the third motor.

On the other hand, the drive power of the fourth motor is transmitted to the ball screw nut by a drive power transmission mechanism (not shown) and, when the ball screw nut rotates forward and backward, the spline shaft 141 moves upward and downward. A fourth encoder (not shown) that detects the amount of movement of the spline shaft 141 relative to the second arm 130 is provided in the fourth motor. The end effector 142 is coupled to the distal end portion of the spline shaft 141.

End Effector

The end effector 142 is coupled to the distal end portion of the spline shaft 141. The end effector 142 has a suction hole (not shown) and may hold an object by suction. The end effector 142 is coupled to a pump (not shown) that changes pressure within the suction hole. The pump is activated to reduce the pressure within the suction hole (for example, the suction hole is brought into the vacuum state by the pump), and thereby, the suction hole may suction the object. The end effector 142 is not particularly limited to, but includes e.g. an effector that grips an object to carry, an effector that processes an object process, etc.

Supporting Part

The supporting part 150 that supports the duct 160 is provided in the upper end portion of the base 110. The wires of the respective electronic components (e.g. the second motor, the third motor, etc.) placed in the second arm 130 are routed through the tubular duct 160 coupling the supporting part 150 and the second arm 130 and the supporting part 150 to the control unit 170 provided in the base 110.

Duct

As shown in FIG. 3, in a plan view from an axial direction of the first pivot axis J1, the duct 160 is coupled pivotably about the first pivot axis J1 relative to the supporting part 150. According to the configuration, the duct 160 pivots with the pivot of the first arm 120 about the first pivot axis J1, and thus, twisting of the wires passing through the duct 160 may be reduced.

Similarly, in the plan view from the axial direction of the first pivot axis J1, the duct 160 is coupled pivotably about the second pivot axis J2 relative to the second arm 130. According to the configuration, the duct 160 pivots with the pivot of the second arm 130 about the second pivot axis J2, and thus, twisting of the wires passing through the duct 160 may be reduced.

Force Detection Unit

As shown in FIG. 1, the force detection unit 180 is provided in the lower portion of the base 110. The force detection unit 180 may detect forces applied to the first arm 120, the second arm 130, and the third arm 140. More specifically, the force detection unit 180 may detect forces in the three axial directions of the x-axis, the y-axis, and the z-axis and torque about the x-axis, about the y-axis, and about the z-axis externally applied, that is, applied by another configuration than the force detection unit 180. As a result, the force detection unit 180 may measure the forces in the three axial directions of the x-axis, the y-axis, and the z-axis and the torque about the x-axis, about the y-axis, and about the z-axis acting on the first arm 120, the second arm 130, and the third arm 140 as other configurations than the force detection unit 180. The output of the force detection unit 180 is transmitted to the control unit 170 and used for control of the robot 100.

The force detection unit 180 is not particularly limited, but a force sensor that can detect forces in the three axial directions of the x-axis, the y-axis, and the z-axis and torque about the x-axis, about the y-axis, and about the z-axis with respect to six axes is used.

Control Unit

The control unit 170 is provided inside of the base 110 and controls actions of the robot 100. The control unit 170 includes a CPU (Central Processing Unit) as a processor.

The CPU realizes various functions by loading and executing control programs installed in a RAM (Random Access Memory) or ROM (Read-Only Memory) that functions as a memory unit.

More specifically, the control unit 170 executes the control program, and outputs control signals to the first motor, the second motor, the third motor, and the fourth motor and control driving of the respective motors. Thereby, the respective motors are driven according to the control signals, and the first arm 120, the second arm 130, and the third arm 140 act. That is, the control unit 170 controls the actions of the first arm 120, the second arm 130, and the third arm 140.

When a teacher applies an external force to the first arm 120, the second arm 130, the third arm 140, or the end effector 142, the control unit 170 controls the first arm 120, the second arm 130, the third arm 140, or the end effector 142 to act based on the detection value detected by the force detection unit 180. That is, the teacher may perform direct teaching. For example, when the teacher grips the third arm 140 and applies a force in the +x-axis direction, the control unit 170 moves the third arm 140 in the +x-axis direction. According to the configuration, the teacher may understand the direction of action of the arm more intuitively and perform teaching more easily than teaching using a teaching apparatus such as a teaching pendant.

When the detection value detected by the force detection unit 180 exceeds a threshold value, the control unit 170 determines that the robot 100 or the end effector 142 unintentionally comes into contact with another configuration and decelerates or stops the action of the first arm 120, the second arm 130, or the third arm 140. As a result, a possibility that the robot 100 or the end effector 142 collides with another configuration and is damaged may be reduced.

Further, in the embodiment, the control unit 170 is provided inside of the base 110, however, may be provided inside of the second arm 130 of the robot 100 or provided in a robot control apparatus separately configured from the robot 100.

Operation Unit

FIG. 2 shows the operation unit 200 provided in the second arm 130 as seen from the +y-axis side. Further, FIG. 3 shows the robot 100 shown in FIG. 1 as seen from the +z-axis side. The operation unit 200 includes a third arm operation part 210, a teaching point registration operation part 220, a teaching mode switching operation part 230, and an end effector operation part 240.

As shown in FIG. 3, the operation unit 200 is provided in the distal end portion of the second arm 130. Here, when a distance from the operation unit 200 to the third pivot axis J3 is D1 and a distance from the second pivot axis J2 to the third pivot axis J3 is D2, a relationship D1<D2 is satisfied. That is, the distance D1 from the operation unit 200 to the third pivot axis J3 is shorter than the distance D2 from the second pivot axis J2 to the third pivot axis J3. The operation unit 200 is placed near the third arm 140 as described above, and thereby, the teacher who performs teaching work on the robot 100 may easily operate the robot 100 while checking the third arm 140.

Third Arm Operation Part

As shown in FIG. 2, the third arm operation part 210 includes four switches for operation of the third arm 140. The teacher presses down a switch 211 or a switch 212, and thereby, may perform an operation of pivoting the third arm 140 to a predetermined angle. On the other hand, the teacher presses down a switch 213 or a switch 214, and thereby, may perform an operation of moving the third arm 140 in a predetermined amount.

The switch 211 (first switch) is placed at the most +x-axis side of the four switches, and the switch 212 (second switch) is placed at the most −x-axis side of the four switches. When the teacher presses down the switch 211, the third arm 140 pivots clockwise as seen from the +z-axis side. Or, when the teacher presses down the switch 212, the third arm 140 pivots counterclockwise as seen from the +z-axis side.

The switch 213 (third switch) is placed at the most +z-axis side of the four switches, and the switch 214 (fourth switch) is placed at the most −z-axis side of the four switches. When the teacher presses down the switch 213, the third arm 140 translationally moves in the +z-axis direction. Or, when the teacher presses down the switch 214, the third arm 140 translationally moves in the −z-axis direction.

The teacher may operate the third arm 140 to desired position and attitude using the above described four switches. Note that the number of the switches is not limited to that, but may be three or less or five or more. Further, the shapes of the switches are not limited to the triangular shapes, but may be polygonal shapes including rectangular shapes and pentagonal shapes or circular shapes.

The third arm operation part 210 is provided in the second arm 130, and thereby, the teacher may operate the action of the third arm 140 more intuitively compared to operation using a teaching apparatus such as a teaching pendant separately configured from the robot.

Teaching Point Registration Operation Part

The teaching point registration operation part 220 is a switch for operation of registration of the teaching point of the robot 100. The teaching point registration operation part 220 is the switch in the circular shape placed at the +z-axis side of the third arm operation part 210. Note that the shape of the switch is not limited to the circular shape, but may be a polygonal shape including a triangular shape and a rectangular shape.

The teacher moves the third arm 140 to the desired position by the operation of the third arm operation part 210 or direct teaching, and then, presses down the teaching point registration operation part 220. The control unit 170 registers a position as a teaching point at spatial coordinates of a control point as a virtual point moving with the third arm 140, which is set to a position previously associated with the third arm 140, in the RAM or ROM as the memory unit according to the operation. For example, the control point is a TCP (Tool Center Point), however, may be a position of the center of gravity of the end effector 142.

According to the configuration, the teacher may perform the operation of registration of the teaching point using the teaching point registration operation part 220 provided in the second arm 130 after moving the third arm 140 to the desired position, and thereby, may perform the teaching work more efficiently.

Teaching Mode Switching Operation Part

The teaching mode switching operation part 230 is a switch for switching operation of the teaching mode in the robot 100. The teaching mode switching operation part 230 is the switch in a rectangular shape placed at the +z-axis side of the third arm operation part 210. Note that the shape of the switch is not limited to the rectangular shape, but may be a polygonal shape including a triangular shape and a pentagonal shape or a circular shape.

The robot 100 is operated in two modes of "jog teach mode" and "direct teach mode". The jog teach mode is a mode in which the operation of the third arm operation part 210 is enabled so that the teacher may operate the third arm 140 using the four switches and direct teaching is disabled. On the other hand, the direct teach mode is a mode in which the teacher may grip the first arm 120, the second arm 130, the third arm 140, or the end effector 142 with a hand, apply a force in a direction to move, and move to the desired position and the operation of the third arm operation part 210 is disabled.

When the teacher presses down the teaching mode switching operation part 230, the switching operation of the teaching mode of the robot 100 is performed. Specifically, when the jog teach mode is selected as the teaching mode, if the teacher presses down the teaching mode switching operation part 230, the control unit 170 switches the teaching mode of the robot 100 from the jog teach mode to the direct teach mode. Or, when the direct teach mode is selected as the teaching mode, if the teacher presses down the teaching mode switching operation part 230, the control unit 170 switches the teaching mode of the robot 100 from the direct teach mode to the jog teach mode.

According to the configuration in which one of the jog teach mode and the direct teach mode is selected, a possibility that the robot 100 performs an action unintended by the teacher may be reduced.

For example, when the teacher presses down the switch 213 for moving the third arm 140 in the +z-axis direction, the detection of the force pressing down the switch 213 (the force in the −y-axis direction) by the force detection unit 180 and the movement of the third arm 140 in the −y-axis direction may be prevented. Further, for example, when the teacher applies a force to the operation unit 200 of the second arm 130 in the −y-axis direction for moving the third arm 140 in the −y-axis direction, the pressing down of the switch 213 of the third arm operation part 210 and the movement of the third arm 140 in the +z-axis direction may be prevented.

Therefore, according to the configuration in which the operation unit 200 has the teaching mode switching operation part 230, the teacher may perform the switching between the teaching modes by the operation in the robot 100, and thereby, may perform the teaching work more efficiently.

End Effector Operation Part

The end effector operation part 240 is a switch for operation of the end effector 142. The end effector operation part 240 is the switch in the circular shape placed at the −z-axis side of the third arm operation part 210. Note that the shape of the switch is not limited to the circular shape, but may be a polygonal shape including a triangular shape and a pentagonal shape.

When the teacher presses down the end effector operation part 240, switching operation of I/O of the end effector 142 is performed. Specifically, when the pump to which the end effector 142 is coupled is not activated, if the end effector operation part 240 is pressed down, the pump is activated and pressure within the suction hole decreases, and suction of an object by the end effector 142 is enabled. On the other hand, when the pump is activated, if the end effector operation part 240 is pressed down, the activation of the pump is stopped and the pressure within the suction hole increases, and the suction of the object in the end effector 142 is released.

As described above, according to the configuration in which the operation unit 200 has the end effector operation part 240, the teacher may perform the operation of the end effector 142 in the robot 100, and thereby, may perform the teaching work more efficiently.

Note that the operation by the end effector operation part 240 is not limited to that described above, but may be operation according to the type of the end effector 142 used for the robot 100. For example, the operation includes switching operation between opening and closing states of a gripping part and switching operation between activation states of a processing machine.

As above, the configuration of the operation unit 200 is explained. According to the above described configuration, the teacher may perform the teaching work using the operation unit 200 provided in the second arm 130 of the robot 100, and thereby, operation in a teaching apparatus such as a teaching pendant is unnecessary and the teaching work may be performed more intuitively. Further, the operation unit 200 is provided in the second arm 130, and thereby, the teaching work may be easily performed regardless of the position or posture of the third arm 140.

Note that, in the embodiment, the third arm operation part 210, the teaching point registration operation part 220, the teaching mode switching operation part 230, and the end effector operation part 240 are the switches, however, may be configured by a touch panel.

The robot 100 may be configured so that the operation unit 200 may project in the second arm 130. The operation unit 200 projects, and thereby, the teacher may grip the operation unit 200 as a grip and easily perform the operation of direct teaching.

The operation unit 200 may have a display part showing the teaching mode being selected. For example, the display part is an LED (Light Emitting Diode) light and may be configured so that the colors or the blinking patterns of the light may be different between the selection of the jog teach mode and the selection of the direct teach mode. According to the configuration, the teacher may easily determine the teaching mode being selected and may efficiently perform the teaching work.

Second Embodiment

In the second embodiment, the configuration of an operation unit 300 is different from that of the first embodiment. The rest of the second embodiment is the same as that of the first embodiment.

Figure 4:
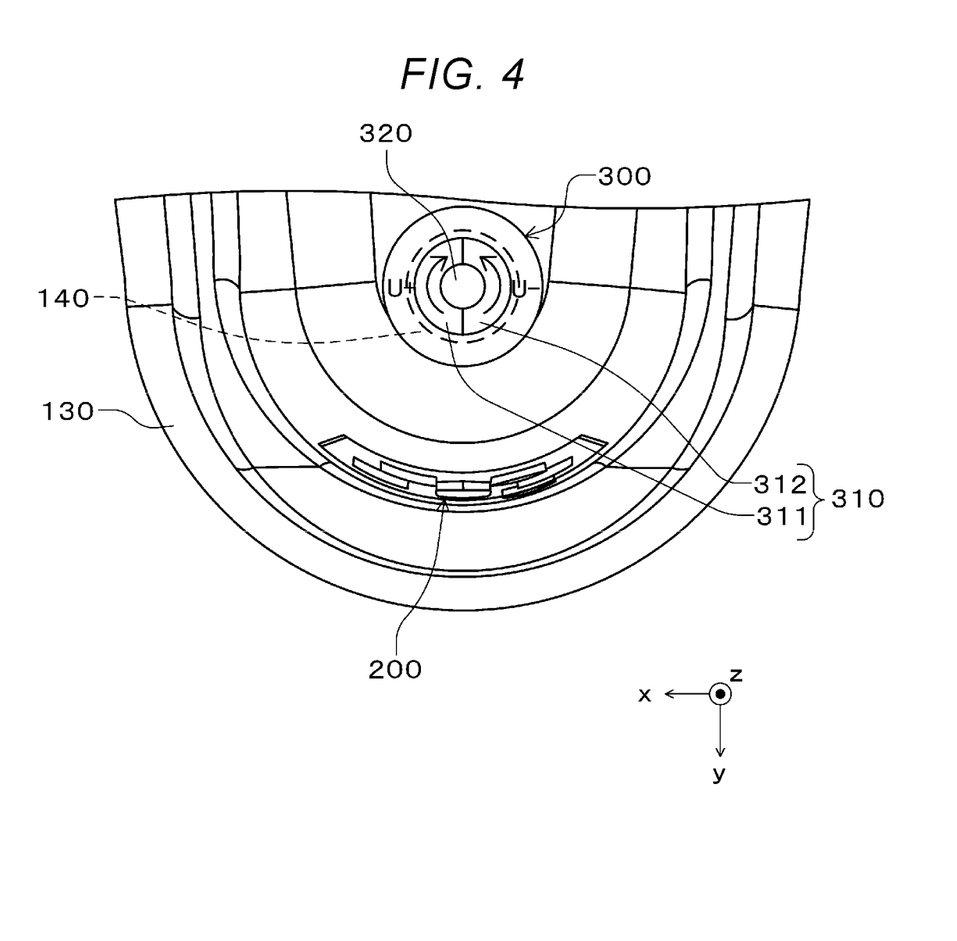
FIG. 4 is a plan view of a second arm distal end portion of a robot according to a second embodiment as seen from the +z-axis side.

FIG. 4 is the plan view of the distal end side of the second arm 130 of the robot according to the second embodiment as seen from the +z-axis side. Note that, hereinafter, for convenience of explanation, FIG. 4 shows an x-axis, a y-axis, and a z-axis as three axes orthogonal to one another, and the head sides of the arrows indicating the respective axes are referred to as "+" and the tail sides are referred to as "−". Further, the directions parallel to the x-axis are referred to as "x-axis directions", the directions parallel to the y-axis are referred to as "y-axis directions", and the directions parallel to the z-axis are referred to as "z-axis directions".

As shown in FIG. 4, the operation unit 300 is provided in the second arm 130 in addition to the operation unit 200. The operation unit 300 is placed in the upper end portion of the second arm 130 and has a third arm operation part 310 and a teaching point registration operation part 320.

The third arm operation part 310 is switches 311, 312 surrounding the teaching point registration operation part 320. The teacher presses down the switch 311 or switch 312, and thereby, may pivot the third arm 140 to a predetermined angle.

The switch 311 (fifth switch) is placed at the +x-axis side of the switch 312 (sixth switch) and, on the other hand, the switch 312 is placed at the −x-axis side of the switch 311.

When the teacher presses down the switch 311, the third arm 140 pivots clockwise as seen from the +z-axis side. Or, when the teacher presses down the switch 312, the third arm 140 pivots counterclockwise as seen from the +z-axis side.

The teaching point registration operation part 320 is a switch for operation of registration of the teaching point of the robot 100. The teaching point registration operation part 320 is the switch in the circular shape placed in a position surrounded by the switch 311 and the switch 312. Note that the shape of the switch is not limited to the circular shape, but may be a polygonal shape including a triangular shape and a pentagonal shape.

The teacher moves the third arm 140 to the desired position by the operation of the third arm operation part 310 or direct teaching, and then, presses down the teaching point registration operation part 320. The control unit 170 registers a position at spatial coordinates of the control point as the teaching point in the memory unit according to the operation.

As seen from the +z-axis side, the operation unit 300 overlaps with the third arm 140. According to the configuration, the direction indicated by the third arm operation part 310 and the direction in which the third arm 140 pivots may be the same, and the teacher may intuitively operate the third arm 140. Further, in the second embodiment, the whole third arm 140 overlaps with the operation unit 300, however, may partially overlap with the operation unit.

As above, the configuration of the operation unit 300 in the second embodiment is explained. According to the above described configuration, the operation direction of the third arm operation part 310 of the operation unit 300 may be the same as that of the third arm 140, and thereby, the operation direction of the third arm 140 may be understood and the teaching work may be performed more intuitively.

Note that, in the embodiment, the operation unit 300 has the third arm operation part 310 and the teaching point registration operation part 320, however, may further has a teaching mode switching operation part and an end effector operation part. Or, a configuration in which only the operation unit 300 is provided in the second arm 130 may be employed.

Third Embodiment

In the third embodiment, the configuration of an operation unit 400 is different from that of the first embodiment. The rest of the third embodiment is the same as that of the first embodiment.

Figure 5:
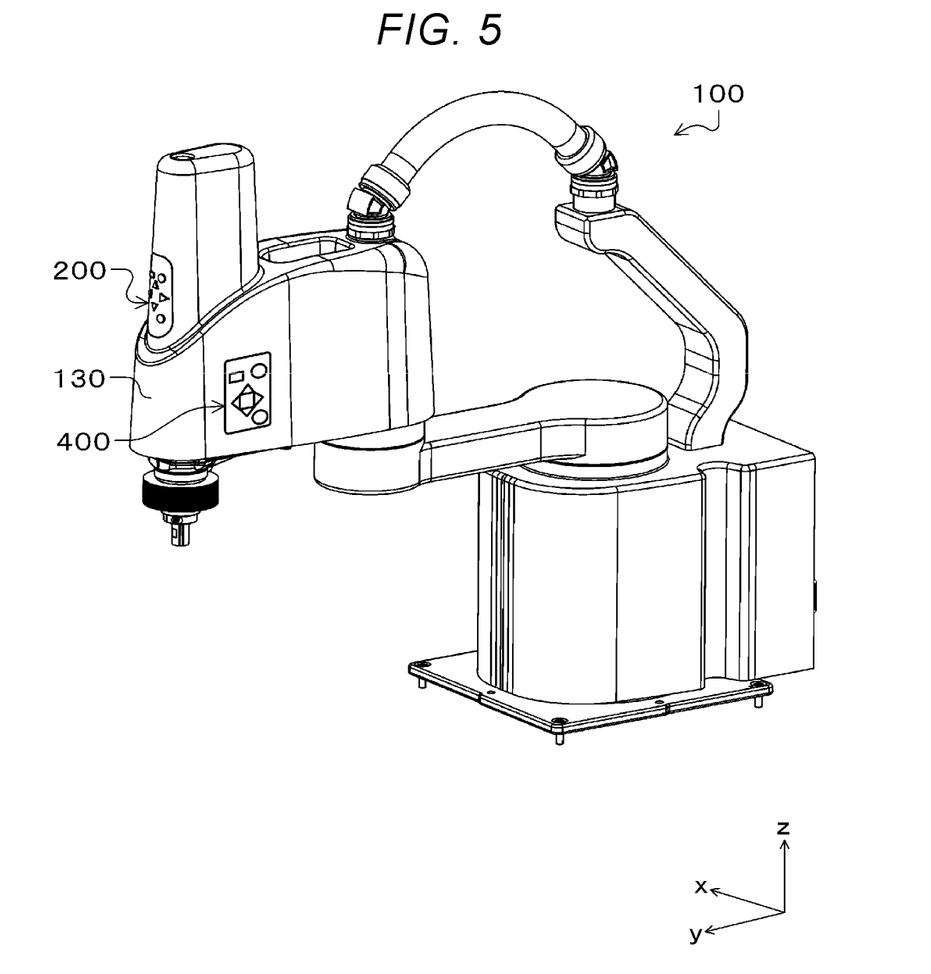
FIG. 5 is a perspective view showing a robot according to a third embodiment.

FIG. 5 is the perspective view showing a robot according to the third embodiment. Note that, hereinafter, for convenience of explanation, FIG. 5 shows an x-axis, a y-axis, and a z-axis as three axes orthogonal to one another, and the head sides of the arrows indicating the respective axes are referred to as "+" and the tail sides are referred to as "−". Further, the directions parallel to the x-axis are referred to as "x-axis directions", the directions parallel to the y-axis are referred to as "y-axis directions", and the directions parallel to the z-axis are referred to as "z-axis directions".

As shown in FIG. 5, the operation unit 400 is provided in the second arm 130 in addition to the operation unit 200. The operation unit 400 is placed on a side surface at the −x-axis side of the second arm 130. Further, the configurations of the switches of the operation unit 400 are the same as those of the operation unit 200 and the explanation thereof will be omitted.

According to the configuration, even when the second arm 130 is located in the position harder to be operated using the operation unit 200, the teacher may perform the teaching work using the operation unit 400 provided in the different position from that of the operation unit 200.

The operation unit 400 is placed on the side surface at the −x-axis side of the second arm 130, however, may be placed on a side surface at the +x-axis side of the second arm 130. Further, the two operation units 200, 400 are provided in the second arm 130, however, the number of the operation units is not limited to that, but may be three or more. For example, when the number is three, the operation units may be respectively provided in the distal end portion of the second arm 130, on the side surface at the −x-axis side of the second arm 130, and on the side surface at the +x-axis side of the second arm 130.

As below, the matter derived from the embodiments will be described.

The horizontal articulated robot includes the base, the force detection unit provided in the base, the first arm coupled to the base and pivoting about the first pivot axis, the second arm coupled to the first arm and pivoting about the second pivot axis, the third arm coupled to the second arm, pivoting about the third pivot axis, and moving in the axial direction of the third pivot axis, the control unit that controls the action of the first arm, the second arm, or the third arm based on the detection value of the force detection unit, and the operation unit having the third arm operation part for operation of the third arm and the teaching point registration operation part for operation of registration of the position of the control point as the teaching point using the control unit, and provided in the second arm.

According to the configuration, the teacher may perform the teaching work of the horizontal articulated robot by the operation using the operation unit provided in the robot and the operation using direct teaching. Therefore, the teacher may intuitively operate while checking the action of the robot and perform the teaching work more easily without using a teaching apparatus such as a teaching pendant.

That is, the teacher moves the control point of the robot to the desired position by operating the third arm operation part or gripping the second arm and performing direct teaching, and registers the teaching point using the teaching point registration operation part. Therefore, operation using a teaching apparatus such as a teaching pendant separately configured from the robot is unnecessary, and the teacher may perform the teaching work only by the operation in the robot.

Further, the operation unit having the third arm operation part is provided in the second arm, and thereby, the teacher may easily move the third arm to the desired position and perform teaching regardless of the position or posture of the third arm.

In the above described horizontal articulated robot, in the plan view from the axial direction of the third pivot axis, the distance from the operation unit to the third pivot axis may be shorter than the distance from the second pivot axis to the third pivot axis.

According to the configuration, the operation unit is provided in the distal end portion of the second arm to which the third arm is coupled, and thereby, the teacher may easily perform the teaching work while checking the third arm.

In the above described horizontal articulated robot, in the plan view from the axial direction of the third pivot axis, the operation unit may overlap with the third arm.

According to the configuration, the operation direction of the third arm operation part may be the same as that of the third arm, and thereby, the teacher may understand the operation direction of the third arm more intuitively.

In the above described horizontal articulated robot, the plurality of the operation units may be provided in the second arm.

According to the configuration, the operation of the third arm may be performed in a plurality of positions, and thereby, the teacher may perform the teaching work using the operation unit in the position easier to operate regardless of the position of the second arm.

In the above described horizontal articulated robot, the operation unit may have the end effector operation part for operation of the end effector attached to the third arm.

According to the configuration, the teacher may perform the operation of the end effector in addition to the operation of the third arm using the operation unit provided in the robot, and thereby, may perform the teaching work more efficiently.

What is claimed is:

1. A horizontal articulated robot comprising:
    a base;
    a force sensor provided in the base;
    a first arm coupled to the base and pivoting about a first pivot axis;
    a second arm coupled to the first arm and pivoting about a second pivot axis;
    a third arm coupled to the second arm, pivoting about a third pivot axis, and moving in an axial direction of the third pivot axis;
    a processor that controls an action of the first arm, the second arm, or the third arm based on a detection value of the force sensor; and
    switches having a third arm operation part for operation of the third arm and a teaching point registration operation part for operation of registration of a position of a control point as a teaching point using the processor, and provided in the second arm,
    the switches further comprise a teaching mode switching operation part for switching operation of the teaching mode in the robot between jog teach mode and direct teach mode, wherein the jog teach mode is a mode in which the operation of the third arm operation part is enabled so that a teacher operates the third arm using the third arm operation part and direct teaching is disabled, wherein the direct teach mode is a mode in which a teacher grips the first arm, the second arm, or the third arm with a hand, applies a force in a direction to move the gripped arm, and moves the gripped arm to the desired position and the operation of the third arm operation part is disabled.

2. The horizontal articulated robot according to claim 1, wherein
    in a plan view from the axial direction of the third pivot axis, a distance from the switches to the third pivot axis is shorter than a distance from the second pivot axis to the third pivot axis.

3. The horizontal articulated robot according to claim 1, wherein
    in a plan view from the axial direction of the third pivot axis, the switches overlap with the third arm.

4. The horizontal articulated robot according to claim 1, wherein
    a plurality of the switches are provided in the second arm.

5. The horizontal articulated robot according to claim 1, wherein
    the switches has an end effector operation part for operation of an end effector attached to the third arm.

6. The horizontal articulated robot according to claim 1, wherein
    the third arm operation part includes two switches for pivoting the third arm to a predetermined angle, and two switches for moving the third arm in a predetermined amount.

7. The horizontal articulated robot according to claim 6, wherein
    the two switches for pivoting the third arm include a switch for pivoting clockwise as seen from an above axial direction of the third pivot axis, and a switch for pivoting counterclockwise as seen from the above axial direction of the third pivot axis.

8. The horizontal articulated robot according to claim 6, wherein
    the two switches for moving the third arm include a switch for moving translationally in an above axial direction of the third pivot axis, and a switch for moving translationally in a below axial direction of the third pivot axis.

9. The horizontal articulated robot according to claim 6, wherein
    the two switches for pivoting the third arm and the two switches for moving the third arm are triangular shapes.

10. The horizontal articulated robot according to claim 1, wherein
    the third arm operation part includes two switches for pivoting the third arm to a predetermined angle, and two switches for moving the third arm in a predetermined amount, wherein the two switches for pivoting the third arm include a switch for pivoting clockwise as seen from an above axial direction of the third pivot axis, and a switch for pivoting counterclockwise as seen from the above axial direction of the third pivot axis,
    wherein the two switches for moving the third arm include a switch for moving translationally in the above axial direction of the third pivot axis, and a switch for moving translationally in a below axial direction of the third pivot axis,
    wherein the switch for pivoting clockwise is placed in far left side position as seen from a direction from the third pivot axis to the second pivot axis, the switch for pivoting counterclockwise is placed in a far right side position as seen from a direction from the third pivot axis to the second pivot axis, the switch for moving translationally in an above axial direction of the third pivot axis is placed in the top position of the four switches, and the switch for moving translationally in a below axial direction of the third pivot axis is placed at the bottom position of the four switches.

* * * * *